United States Patent
Komiyama (10) Patent No.: US 11,106,418 B2
(45) Date of Patent: Aug. 31, 2021

(54) IMAGE DISPLAY APPARATUS, IMAGE OUTPUT APPARATUS, CONTROL METHODS THEREOF, AND STORAGE MEDIUM

(71) Applicant: CANON KABUSHIKI KAISHA, Tokyo (JP)

(72) Inventor: Tomoaki Komiyama, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/926,886

(22) Filed: Jul. 13, 2020

(65) Prior Publication Data
US 2021/0034317 A1  Feb. 4, 2021

(30) Foreign Application Priority Data

Jul. 31, 2019  (JP) .............................. JP2019-141683

(51) Int. Cl.
*G06F 3/14* (2006.01)
*H04N 5/63* (2006.01)
*H04N 9/31* (2006.01)

(52) U.S. Cl.
CPC ............. *G06F 3/1446* (2013.01); *H04N 5/63* (2013.01); *H04N 9/3147* (2013.01)

(58) Field of Classification Search
CPC ............ G06F 3/1446; G09G 2330/021; G09G 2370/10; G09G 2370/22; H04N 21/4122; H04N 21/4436; H04N 5/63; H04N 9/3182; H04N 5/74; H04N 9/3147
See application file for complete search history.

(56) References Cited

U.S. PATENT DOCUMENTS

| | | | |
|---|---|---|---|
| 9,197,571 B2 * | 11/2015 | Kimura | H04L 47/263 |
| 2009/0051820 A1 | 2/2009 | Oikawa | |
| 2013/0063778 A1 * | 3/2013 | Nagasawa | H04N 1/00204 358/1.15 |
| 2015/0261288 A1 * | 9/2015 | Maruhashi | G06F 13/385 358/1.14 |
| 2018/0039380 A1 | 2/2018 | Fujimori | |
| 2018/0091725 A1 * | 3/2018 | Ishikuri | H04W 88/06 |
| 2020/0007784 A1 * | 1/2020 | Shoda | G06F 3/0482 |

FOREIGN PATENT DOCUMENTS

JP  2009-055149 A  3/2009

* cited by examiner

*Primary Examiner* — Paulos M Natnael
(74) *Attorney, Agent, or Firm* — Venable LLP (57) ABSTRACT

An image display apparatus includes an input unit that receives an image from a first external apparatus, an output unit that outputs an image to a second external apparatus, a communication unit that performs communication with the first external apparatus or the second external apparatus, a receiving unit that receives a control signal that is transmitted from the first external apparatus and indicates that the first external apparatus transits to an image signal transmission stopping state, an inquiry unit that inquires of the second external apparatus about whether or not the second external apparatus supports the transmission stopping state, and a control unit that, in a case the control signal is received, switches a response to the control signal according to a result of the inquiry of the inquiry unit.

19 Claims, 8 Drawing Sheets

IMAGE DISPLAY APPARATUS, IMAGE OUTPUT APPARATUS, CONTROL METHODS THEREOF, AND STORAGE MEDIUM

BACKGROUND OF THE INVENTION

Field of the Invention

The present invention relates to a technique for controlling a transition to a specific operation mode in a state in which image display apparatuses are cascade-connected.

Description of the Related Art

Some image display apparatuses, such as television sets, monitors, and projectors, can be connected in a plurality of stages, which is a so-called cascade connection. By a plurality of cascade-connected image display apparatuses being connected to an image output apparatus such as a PC (Personal Computer) or a player, and transmitting and receiving image signals according to a predetermined standardized protocol, different images can be displayed on the image display apparatuses.

Also, the image output apparatus is configured to, depending on the protocol, check various types of information such as the performance information of each image display apparatus when transmitting and receiving an image signal, and output the image signal according to the checked performance information.

In the case of cascade connection, the performance of each image display apparatus connected to the image output apparatus is checked, but the performance of an image display apparatus connected in a subsequent stage of the image display apparatus may be relatively low. In this case, an image signal generated taking into consideration of the low-performance image display apparatus may not be output.

To address this, Japanese Patent Laid-Open No. 2009-55149 discloses a technique for cascade-connected television sets, wherein the performance information of a television set connected to an image output apparatus is changed based on receivable resolution information of a television set connected in a subsequent stage of the television set. With this configuration, the cascade-connected television sets can receive image signals with their receivable resolutions.

In recent years, there is a technique provided for the purpose of saving power of apparatuses, wherein if a predetermined condition is satisfied, an image output apparatus transits to a power saving mode and stops outputting images, and an image display apparatus keeps displaying an image based on an image signal output before the image output apparatus stops outputting images.

With this technique, the image output apparatus can reduce power consumption by stopping graphics processing, image transmission processing, and the like that consume a large amount of power. Also, the image display apparatus can keep displaying an image by stopping writing a received image signal into a frame buffer, or in other words, freezing the image.

If this technique is applied to, for example, the cascade-connected image display apparatuses disclosed in Japanese Patent Laid-Open No. 2009-55149, the image display apparatuses need to perform control to receive images at their receivable resolutions. It is also necessary to perform frame buffer update control and appropriate mode transition control in both of the image display apparatuses and the image output apparatuses, and the like.

Furthermore, a case may be considered where, among the cascade-connected image display apparatuses, there is an image display apparatus that does not support this technique. In this case, if the image output apparatus transits to a power saving mode based on this technique, display on the image display apparatus that does not support this technique may be disturbed.

SUMMARY OF THE INVENTION

The present invention has been made in view of the problems described above, and the present invention enables control of transition of an image output apparatus to a power saving mode to be performed appropriately when image display apparatuses are cascade-connected to the image output apparatus.

According to a first aspect of the present invention, there is provided an image display apparatus comprising: at least one processor or circuit configured to function as: an input unit that receives an image from a first external apparatus; an output unit that outputs an image to a second external apparatus; a communication unit that performs communication with the first external apparatus or the second external apparatus; a receiving unit that receives a control signal that is transmitted from the first external apparatus via the communication unit and indicates that the first external apparatus transits to an image signal transmission stopping state; an inquiry unit that inquires of the second external apparatus about whether or not the second external apparatus supports the transmission stopping state via the communication unit; and a control unit that, in a case the control signal is received, switches a response to the control signal according to a result of the inquiry of the inquiry unit.

According to a second aspect of the present invention, there is provided an image output apparatus comprising: at least one processor or circuit configured to function as: a transiting unit that performs a transition to an image signal transmission stopping state based on a predetermined condition; a communication unit that performs communication with one or more external apparatuses that can be cascade-connected; an inquiry unit that inquires of the one or more external apparatuses about whether or not the one or more external apparatuses support the transmission stopping state via the communication unit; and a control unit that switches between whether or not to perform a transition to the transmission stopping state by the transiting unit according to a result of the inquiry of the inquiry unit.

According to a third aspect of the present invention, there is provided a method for controlling an image display apparatus including: an input unit that receives an image from a first external apparatus; an output unit that outputs the image to a second external apparatus; and a communication unit that performs communication with the first external apparatus or the second external apparatus, the method comprising: receiving a control signal that is transmitted from the first external apparatus via the communication unit and indicates that the first external apparatus transits to an image signal transmission stopping state; inquiring of the second external apparatus about whether or not the second external apparatus supports the transmission stopping state via the communication unit; and in a case the control signal is received, switching a response to the control signal according to a result of the inquiry.

According to a fourth aspect of the present invention, there is provided a method for controlling an image output apparatus including: a transiting unit that performs a transition to an image signal transmission stopping state based on a predetermined condition; and a communication unit that performs communication with one or more external apparatuses that can be cascade-connected, the method comprising: inquiring of the one or more external apparatuses about whether or not the one or more external apparatuses support the transmission stopping state via the communication unit; and switching between whether or not to perform a transition to the transmission stopping state by the transiting unit according to a result of the inquiry.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
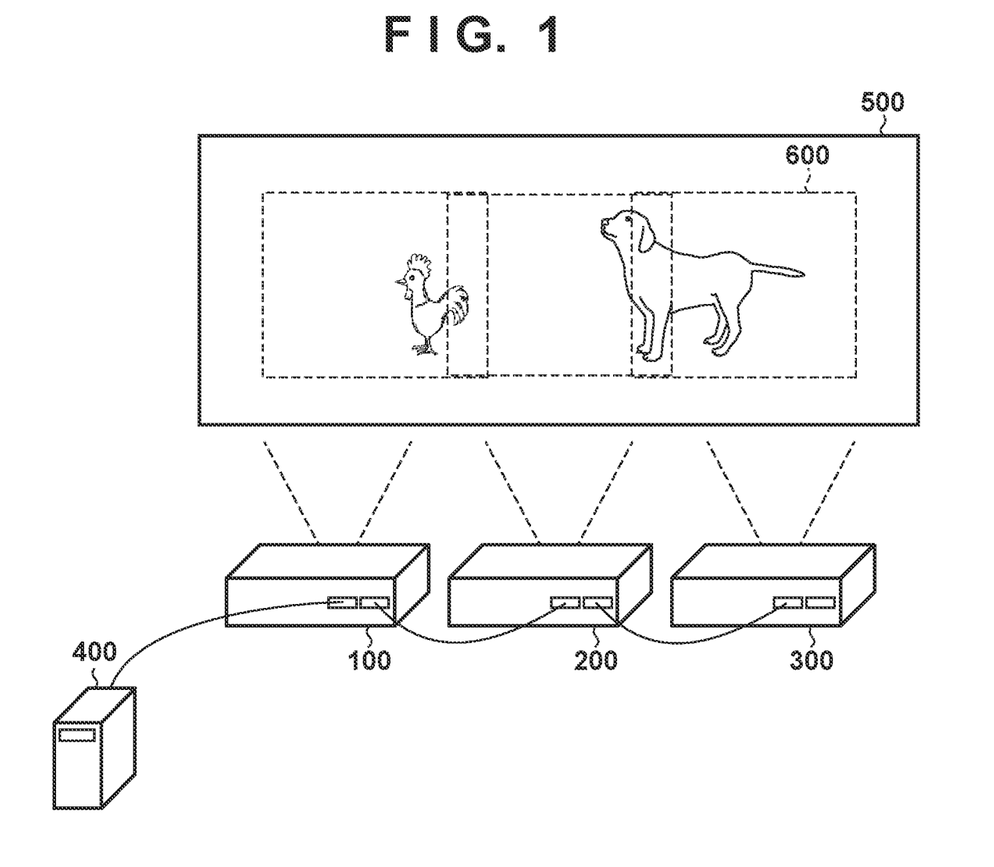
FIG. 1 is an overview of an image display system in which a PC and three projectors are connected.

In the present embodiment, an image display system in which three cascade-connected projectors that are image display apparatuses and a PC that is an image output apparatus are connected will be described. FIG. 1 is an overview of the image display system in which a PC is connected to three cascade-connected projectors.

In FIG. 1, three projectors 100, 200, and 300, each including an image input unit and an image output unit, are cascade-connected via cables. A PC 400 is connected to the image input unit of the projector 100. Images are projected from the projectors 100, 200, and 300 onto a screen 500, and an image 600 is thereby displayed.

Hereinafter, a description will be given of the main components of the projector 100 and the PC 400, and the operations of the apparatuses when displaying an image. The projector 200 and the projector 300 have the same configuration as that of the projector 100, and thus a description thereof is omitted.

The main components of the apparatuses will be described first, and thereafter, the basic operations of the apparatuses, and the basic operations of the projector and the PC performed when the PC 400 transits to a power saving mode will be described. After that, a characteristic operation of the present embodiment, specifically, a transition control operation according to the performance of each of the cascade-connected projectors, performed when the PC transits to the power saving mode, will be described.

Description of Main Components of Projector

Figure 2:
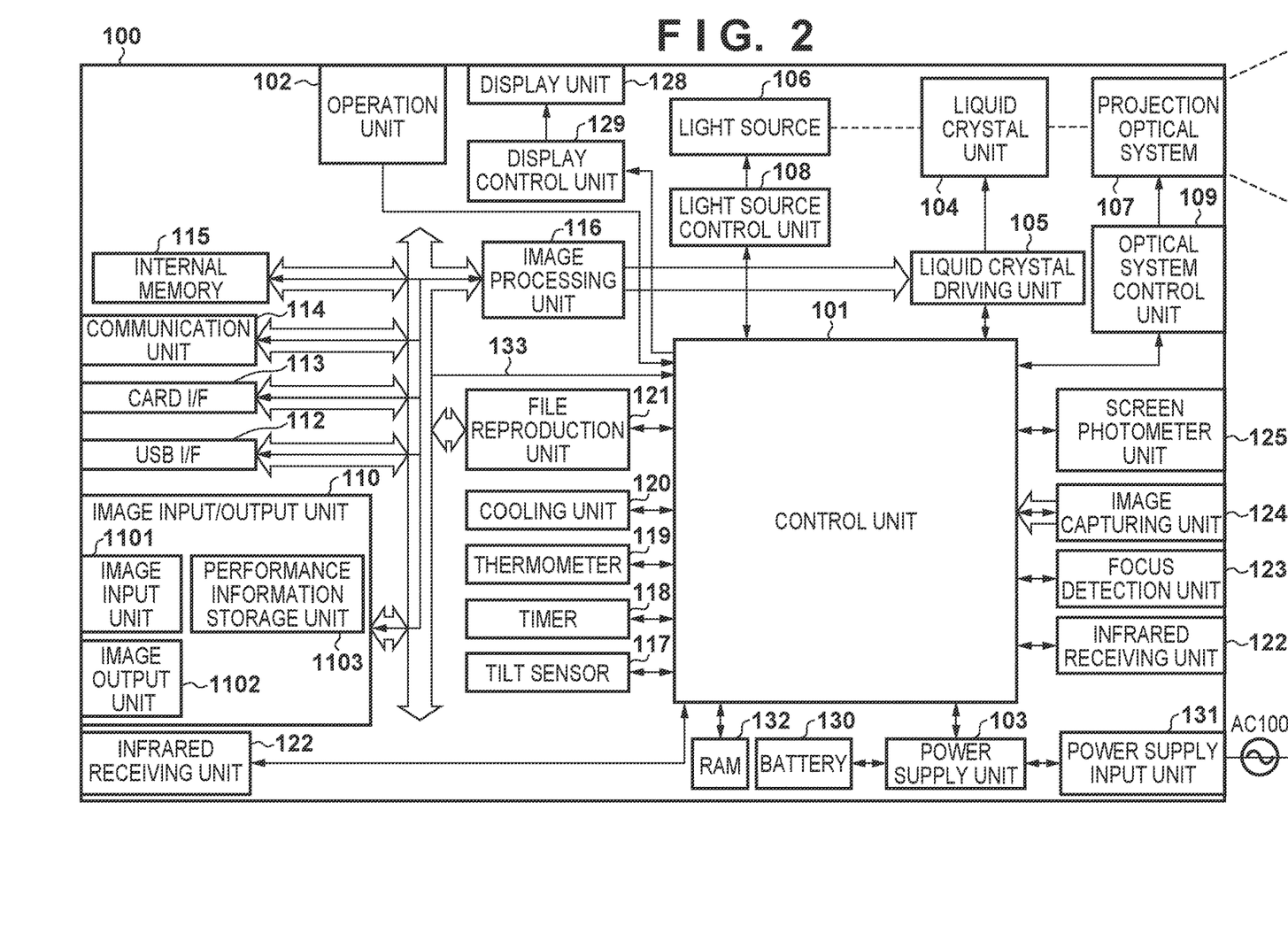
FIG. 2 is a diagram showing the internal configuration of a projector.

FIG. 2 is a diagram showing the main components of the projector 100 according to the present embodiment.

In FIG. 2, the projector 100 includes a control unit 101 for controlling blocks included in the projector 100. The control unit 101 is connected to other blocks via a bus 133, and thus can access the blocks for transmitting a control instruction to each block, exchanging data, and the like.

An operation unit 102 receives an operation from the user. A power supply unit 103 controls supply of power to each block included in the projector. A liquid crystal unit 104 is composed of one liquid crystal panel, three liquid crystal panels, or the like, and an image is formed on the liquid crystal panel(s). A liquid crystal driving unit 105 is a driving unit for forming an image on the liquid crystal panel(s) of the liquid crystal unit 104 based on an input image signal. A light source 106 emits light to the liquid crystal unit 104.

A projection optical system 107 projects an optical image obtained as a result of the light emitted from the light source 106 passing through the liquid crystal unit 104. A light source control unit 108 controls the amount of light of the light source 106, and the like. An optical system control unit 109 controls the operations of a zoom lens, a focus lens, and the like that are included in the projection optical system 107, and performs zoom magnification changes, focus adjustment, and the like.

An image input/output unit 110 is an input/output unit for inputting/outputting digital image signals, and includes an image input unit 1101, an image output unit 1102, and a performance information storage unit 1103. In the present embodiment, it is assumed that the image input unit 1101 and the image output unit 1102 transmit and receive DisplayPort® (hereinafter referred to simply as "DP") signals. The image input unit 1101 and the image output unit 1102 can transmit and receive image signals, audio signals, metadata, control signals, and the like based on the DisplayPort protocol specified by the DP standard.

The image input/output unit 110 can also process image signals in which a plurality of images are multiplexed based on the DP standard. If the image input unit 1101 receives the image signals in which a plurality of images are multiplexed from the PC 400, the image input unit 1101 transmits only image signals for the projector 100 to an image processing unit 116 in a subsequent stage, and outputs signals including images for other projectors to a projector in a subsequent stage from the image output unit 1102.

In the performance information storage unit 1103, information including receivable image format information, signal transmission rate information, and information as to whether or not other optional functions are supported, such as EDID (Extended Display Identification Data) and DPCD (Display Port Configuration Data), are stored based on a predetermined format. The EDID stored in the performance information storage unit 1103 can be read and written based on an instruction from the control unit 101. The DPCD can be read and written not only based on an instruction from the control unit 101, but also based on a request from the PC 400. In the case where instructions to read and write the EDID and the DPCD are issued from the PC 400, access is made via an auxiliary communication path called AUX-CH (Auxiliary-Channel).

A USB interface 112 is an interface that receives, from the outside, files of various types of information data such as video data, image data, and image files, or outputs them to the outside. Also, a pointing device, a keyboard, a USB flash memory, or the like may be connected to the USB interface 112.

A card interface 113 is an interface that reads and writes, from and into a card-type recording medium, files of various types of information data with such as video data, image data, and image files, and into which an SD card, Compact Flash®, or the like can be inserted.

A communication unit 114 is a communication unit that transmits and receives files of various types of information data such as video data, image data, and image files and other command signals via an intranet or the Internet, and is, for example, a wired LAN, a wireless LAN, or the like.

An internal memory 115 is a memory in which files of various types of information data such as image data and user settings data are stored, and is a semiconductor memory, a hard disk, or the like. The image processing unit 116 performs various types of processing operations on image data.

Here, an overall operation of the components described above will be described. For example, a document file input from the card interface 113 is reproduced by a file reproduction unit 121. The file reproduction unit 121 generates, from the document file, an image signal to be presented to the user, and outputs the generated image signal to the image processing unit 116. An image signal input from the image input unit 1101 is output directly to the image processing unit 116.

The image processing unit 116 performs processing on the image signals obtained from the image input unit 1101 and the file reproduction unit 121 based on control of the control unit 101, the processing including a correction to make an input image suitable to display on the liquid crystal unit 104, superimposing an OSD (On Screen Display) image on an input image, and the like. For example, the image processing unit 116 converts the number of pixels of an input image signal to the number of pixels of the liquid crystal panel, doubles the frame rate of the input image signal so as to AC drive the liquid crystal panel, and performs a correction to make it suitable for the liquid crystal panel to form an image.

As used herein, the expression "to AC drive the liquid crystal panel" refers to a method in which display is performed by alternating the direction of voltage applied to the liquid crystal of the liquid crystal panel, the method utilizing the properties that an image can be reproduced irrespective of whether the direction of voltage applied to the liquid crystal by the liquid crystal panel is the forward direction or the reverse direction. At this time, it is necessary to send an image for the forward direction and an image for the reverse direction to the liquid crystal driving unit 105, and thus the image processing unit 116 performs processing of doubling the frame rate of the image signal. The liquid crystal driving unit 105 causes the liquid crystal panel(s) of the liquid crystal unit 104 to form an image based on the image signal obtained by the image processing unit 116.

Here, the description has been given by taking a liquid crystal panel(s) that is driven by an analog signal as an example, but the present invention is not limited to this method. For example, a liquid crystal panel(s) that can be driven by a digital signal may be used. In this case, the liquid crystal driving unit 105 controls the liquid crystal panel(s) by a predetermined pulse width modulation (PWM) driving based on an image signal output from the image processing unit 116. Also, even in the case where a liquid crystal panel(s) that is driven by a digital signal such as PWM is used, the frame rate may be doubled such that a technique for reducing image degradation such as disclination caused by the driving method can be used.

The image signal output from the image input/output unit 110 to the image processing unit 116 includes a synchronization signal and an image signal, and is stored in an internal register or the like that can be read by the control unit 101 by measuring the timing of each signal. Also, in the case where the projector projects an image in a direction oblique to the screen, and the projected image on the screen is distorted into, for example, a trapezoidal shape, the image processing unit 116 also performs a keystone correction on the projected image by deforming the shape of the image so as to cancel out the trapezoidal distortion.

In the case where the keystone correction is performed, the enlargement factor/reduction factor in the horizontal direction and/or the vertical direction of the image displayed on the liquid crystal panel(s) is changed. In this way, the trapezoidal distortion of the projected image on the screen and distortion of the image region on a display element are cancelled out by each other, and the image is displayed on the screen to be closer to a rectangular image display region with a normal aspect ratio. The keystone correction may be carried out automatically based on an inclination angle obtained by an inclination sensor 117, which will be described later, or may be carried out by the user operating the operation unit 102 or the like.

Returning to the description of the components shown in FIG. 2, the inclination sensor 117 is a sensor that detects the inclination of the projector 100. A timer 118 detects the operation time of the projector 100, the operation time of each block, and the like. A thermometer 119 measures the temperature of the light source 106 in the projector 100, the temperature of the liquid crystal unit 104 in the projector 100, the outside temperature, and the like. A cooling unit 120 is a cooling unit for cooling the projector 100 by, for example, dissipating heat from the projector 100 to the outside, and is composed of, for example, a heatsink and a fan. The file reproduction unit 121 decodes encoded file data and the like based on an instruction from the control unit 101.

An infrared ray receiving unit 122 is an infrared ray receiving unit that receives infrared rays from a remote controller that comes with the projector 100 or from other devices, and sends a signal to the control unit 101. For example, a plurality of infrared ray receiving units are provided at a plurality of locations on the projector in the front back direction or the like.

A focus detection unit 123 is a focus detection unit that detects the distance between the projector 100 and the screen, and calculates the focal distance. An image capturing unit 124 captures images in the direction of the screen. A screen photometer unit 125 measures the amount of light reflected by the screen and the brightness of the light.

A display unit 128 is provided in the main body of the projector 100, and displays the state of the projector, a warning, and the like. A display control unit 129 controls the display unit 128. A battery 130 supplies power when the projector 100 is used by being carried. A power supply input unit 131 receives AC power from the outside, rectifies the received AC power into a predetermined voltage, and supplies the voltage to the power supply unit 103.

A RAM 132 is a memory that is used to deploy the programs stored in the internal memory 115, or used in image processing operations performed by the liquid crystal driving unit 105, the image input/output unit 110, and the image processing unit 116. The bus 133 is a bus connected to each processing block, and is used to control each block, or the like.

Description of Main Components of PC

Figure 3:
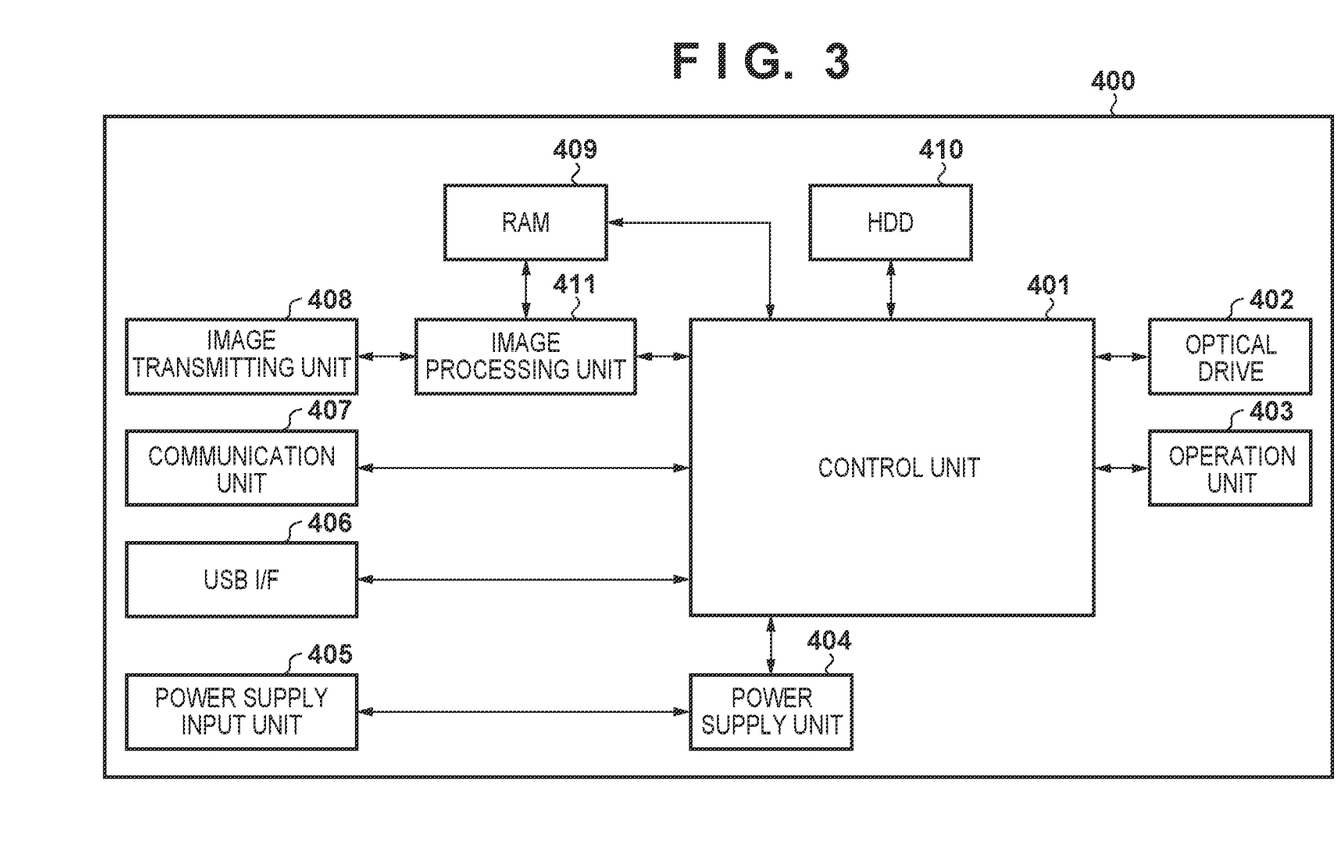
FIG. 3 is a diagram showing the internal configuration of the PC.

Next, the main components of the PC 400 will be described with reference to FIG. 3.

The PC 400 includes a control unit 401 for controlling each block included in the PC 400. An optical drive 402 reads and writes data from and into an optical medium, or the like. An operation unit 403 is composed of buttons or the like to perform operations such as a PC power supply control operation and a reset operation. A power supply unit 404 supplies power to each unit based on an instruction from the control unit 401. A power supply input unit 405 receives AC power from the outside, rectifies the received AC power into a predetermined voltage, and supplies the voltage to the power supply unit 404. A USB interface 406 is an interface to which input apparatuses such as a mouse and a keyboard can be connected. Here, it is assumed that the USB interface 406 is an image transmitting unit that can transmit DP image signals. A communication unit 407 is a communication unit that transmits and receives files of various types of information data such as video data, image data, and image files, and other command signals via an intranet or the Internet, and is, for example, a wired LAN, a wireless LAN, or the like.

An image transmitting unit 408 transmits an image generated by the PC 400 based on an instruction from the control unit 401 in a predetermined format. A RAM 409 is used to deploy the programs stored in a HDD 410 and various types of data, and also used for image processing performed by an image processing unit 411, and the like. The HDD 410 is a storage device for storing various types of programs including an OS (Operating System) and various types of information including documents, images, image content, and the like. The image processing unit 411 performs various types of image processing operations by using the RAM 409 as a frame memory based on the information and the like stored in the HDD 410, and outputs an image signal to the image transmitting unit 408.

Description of Image Display Operation when Projector 100 and PC 400 are Connected Here, a normal operation in which the projector 100 is connected to the PC 400, and the projector 100 receives an image and displays the image will be described with reference to the operation flows of the projector 100 and the PC 400 shown in FIGS. 4A and 4B. Here, it is assumed that the projector 100 and the PC 400 are connected with a DP cable, and an image is displayed through control specified by the DP standard.

Figure 4A:
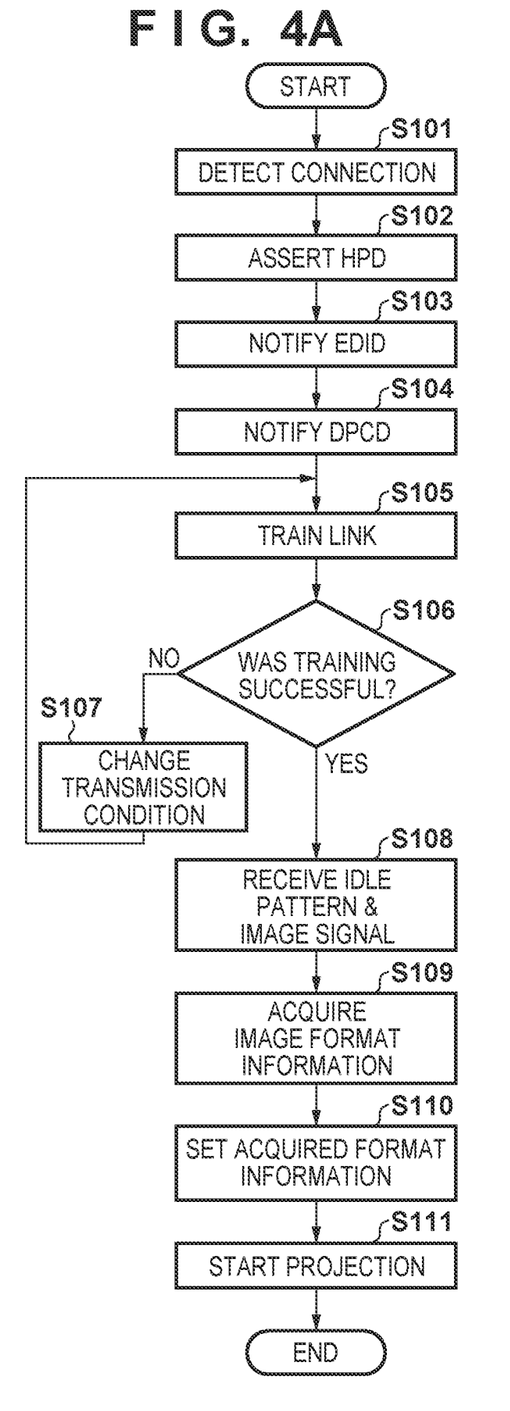
FIGS. 4A and 4B are flowcharts respectively illustrating the operations of the projector and the PC performed when displaying an image.
Figure 4B:
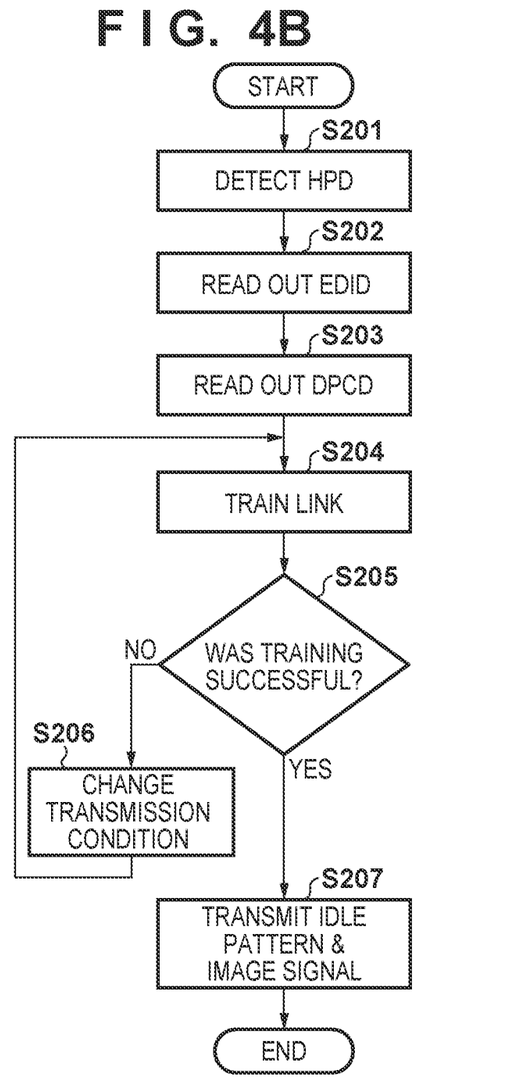

FIG. 4A is a flowchart illustrating an operation of the projector 100, the operation being performed after the projector 100 is connected to the PC 400 with a DP cable.

First, in step S101, the control unit 101 of the projector 100 detects, through polling or interruption, that the projector 100 has been connected to the PC 400 with a DP cable.

If the connection is detected in step S101, then, in step S102, the control unit 101 asserts a HPD (Hot Plug Detect) signal via one line included in the DP cable, and notifies the PC 400 that the projector 100 has been connected to the PC 400. The PC 400 that has received the notification of the HPD signal issues a request to read EDID to the projector 100 via the AUX-CH included in the DP cable.

If the request to read EDID is received from the PC 400 in step S103, the image input unit 1101 reads the EDID from the performance information storage unit 1103, and notifies the PC 400 of the readout via the AUX-CH. When the EDID has been read from the projector 100, then, the PC 400 issues a request to read DPCD via the AUX-CH. The DPCD includes information that is needed to determine transmission parameters such as the transmission rate of a signal that can be received by the projector 100 and the number of transmission lanes, and is stored in the performance information storage unit 1103.

If the request to read DPCD is received from the PC 400 in step S104, the image input unit 1101 reads the DPCD from the performance information storage unit 1103, and notifies the PC 400 of the readout via the AUX-CH. Here, information such as the transmission data rate supported by the projector 100 and the number of lines that can be used by the projector 100 are notified. The PC 400 determines, based on the EDID and the DPCD read from the projector 100, the transmission rate and the number of transmission lanes according to the image format (resolution, frame rate, bit depth, and the like) of the image to be transmitted, and transmits an image signal. When the DPCD has been read from the projector 100, the PC 400 issues a request to start link training to the projector 100 based on the read information. As used herein, the term "link training" refers to so-called handshake processing for establishing a communication path such as determining communication parameters.

In step S105, the link training is started based on the request from the PC 400. Here, the link training is carried out based on the information exchanged in advance such as the DPCD transmission data rate and the number of lines that can be used by the projector 100. In the link training, whether each of clock data recovery check, channel equalization check, and 8B10B symbol data alignment check has been successful or not, and the like is checked sequentially based on test patterns made of symbol data that is 8B10B encoded. The projector 100 writes the results indicating that each checked item has been successful or not into the DPCD in the image input/output unit 110.

In step S106, the PC 400 reads the results of the link training from the DPCD in the projector 100 via the AUX-CH, and checks whether or not the link training has been successful. If it is determined that the link training has failed, the processing transits to step S107, where the transmission condition is changed according to the procedure specified by the DP standard, and link training is performed again.

If it is determined that the link training has been successful, the PC 400 starts outputting, to the projector 100, a predetermined number of 8B10B symbol data as idle patterns based on the transmission rate and the number of transmission lanes when the link training was carried out. Upon completion of outputting idle patterns for a predetermined period, then, the PC 400 starts outputting an image signal in an image format determined based on the read EDID.

In step S108, the image input unit 1101 receives the idle patterns and the image signal that are output from the PC 400.

In step S109, the control unit 101 detects, through polling or an interruption notification from the image input unit 1101 to the control unit 101, that an image signal has been received, and reads image signal format information from the image input unit 1101.

Specifically, the control unit 101 reads attribute information of the image signal specified by the DP standard inserted during a blanking period from the image input unit 1101 into a temporary storage unit such as the RAM 132. In step S109, the control unit 101 sets horizontal and vertical resolutions in the attribute information into the image processing unit 116 based on the read information, and performs various types of image processing operations and processing of superimposing the resolution information on an ODS menu.

Through the processing described above, the image signal in a predetermined format obtained from the image input unit 1101 forms an image on the liquid crystal unit via the image processing unit 116 and the liquid crystal driving unit 105. The image is illuminated by light from the light source 106, and a projected image is projected by the projection optical system 107.

Next, an operation in which the PC 400 transmits an image signal after it has been connected to the projector 100 will be described with reference to FIG. 4B.

In step S201, the image transmitting unit 408 detects that the HPD signal has been asserted. Then, in step S202, the image transmitting unit 408 outputs a request to read EDID via the AUX-CH.

If the EDID has been read, then, in step S203, the image transmitting unit 408 outputs a request to read DPCD via the AUX-CH.

If the DPCD has been read, in step S204, the image transmitting unit 408 starts link training based on the read information.

Next, the image transmitting unit 408 outputs a request to read information regarding whether or not the link training has been successful to the projector 100 via the AUX-CH, and receives the result. Then, in step S205, the image transmitting unit 408 determines whether or not the link training has been successful.

If it is determined in step S205 that the link training has failed, the processing transits to step S206, where the image transmitting unit 408 changes the transmission condition, and the processing returns to step S204, where the image transmitting unit 408 starts link training again.

If it is determined in step S205 that the link training has been successful, the processing transits to step S207.

In step S207, the image transmitting unit 408 transmits a predetermined number of 8B10B symbol data as idle patterns based on the transmission condition when the link training was successful, and thereafter transmits an image signal in an image format based on the read EDID. The image transmitting unit 408 determines the format for the image signal to be output based on the content of the read EDID, and outputs the image signal.

Through the operations of the projector 100 and the PC 400 described above, the projector 100 projects an image.

The operations performed in the case where the projector 100 is connected to the PC 400 have been described, but in the case where a plurality of connected projectors 100 to 300 are connected to the PC 400 as shown in the external view of FIG. 1, a different operation flow is performed to transmit image signals.

In the case where the PC 400 outputs image signals to a plurality of cascade-connected projectors, the PC 400 acquires information such as the number of display apparatuses that are present on the topology and the number of connection paths acquired in advance via the AUX-CH when a cable was connected, and assigns an ID to each image display apparatus.

When outputting the image signals, the PC 400 transmits, in a time-division multiplex manner, a plurality of image signals that correspond to the number of image display apparatuses based on a predetermined data structure determined from the acquired information. An ID has been assigned to each of the multiplexed image signals, and thus the projectors 100 to 300 acquire data that correspond to their IDs from the received image signals. In the case where a projector is connected in a subsequent stage, the projectors 100 to 300 again transmit, in a time-division multiplex manner, image signals including data that correspond to the IDs of other apparatuses in a parallel processing manner.

As described above, as a result of the projector 100 to 300 transmitting data in a relay manner, the image signals are transmitted from the PC 400 to the projectors, whereby the plurality of cascade-connected projectors shown in the external view of FIG. 1 project images.

Description of Operation when PC 400 Transits to Power Saving Mode

Figure 5A:
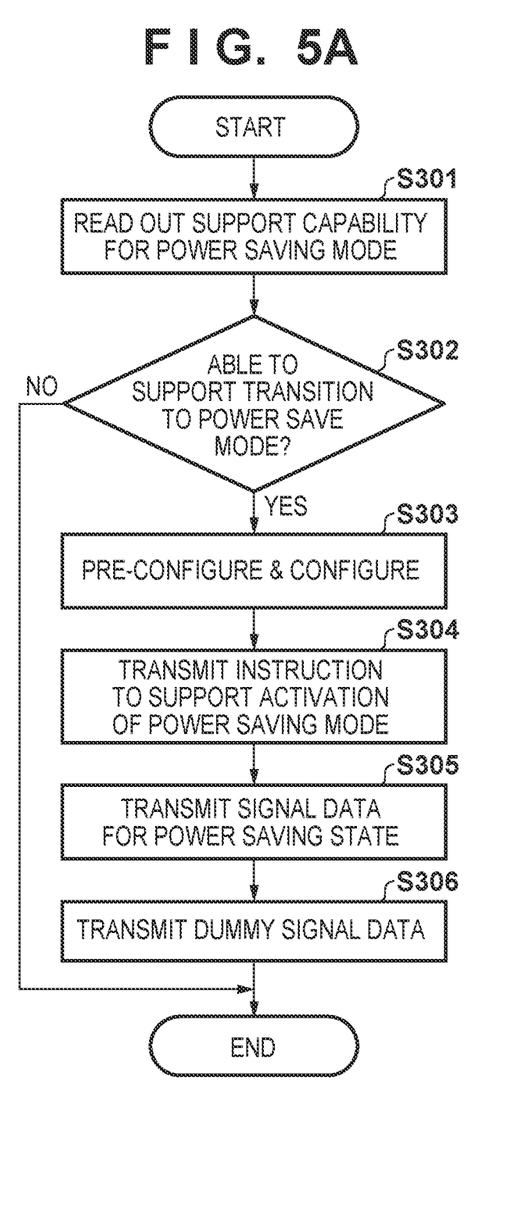
FIGS. 5A and 5B are flowcharts respectively illustrating the operations of the PC and the projector performed when transiting to a power saving mode.

Next, a description will be given of normal operations of the PC 400 and the projector 100 when the PC 400 transits to a power saving mode (image signal transmission stopping state) while the projector 100 is projecting an image. FIG. 5A is a flowchart illustrating an operation of the PC 400.

If a predetermined condition is satisfied, the PC 400 transits to a power saving mode. The predetermined condition may be, for example, a condition in which a user operation is not performed for a predetermined period, there is no change in the output image for a predetermined period, or the like. Here, it is assumed that any one of the conditions is satisfied, and an operation for transiting to the power saving mode will be described.

In step S301, the control unit 401 issues an instruction to the image transmitting unit 408 to transmit, to the projector 100, a request to transmit support capability information for transition to the power saving mode, and reads the information from the image transmitting unit 408.

In step S302, the control unit 401 determines whether or not the projector 100 has support capability. As used herein, the term "support capability" refers to, as described above, the ability to stop writing an image signal received by the projector into the frame buffer, or in other words, freeze a displayed image. If the control unit 401 determines that the projector 100 does not have (not support) support capability, the processing ends. If the control unit 401 determines that the projector 100 has support capability, in step S303, control for transition to the power saving mode is started.

In step S303, the PC 400 carries out, together with the projector 100, pre-configuration and configuration operations for transition to the power saving mode. In the pre-configuration operation, for example, the control unit 401 writes the above-described information into the RAM 409 in order to store internal state information of the PC 400. Also, the control unit 401 issues an instruction to make settings for a communication method performed if an error occurs during the power saving mode to the projector 100 via the image transmitting unit 408. In the configuration operation, the image transmitting unit 408 re-establishes the handshake communication path with the projector 100 before a transition to the power saving mode is made based on an instruction from the control unit 401. Also, the control unit 401 issues, to the image transmitting unit 408, an instruction to transit to a mode in which power consumption is reduced. Alternatively, processing may be performed in which the control unit 401 issues, to the power supply unit 404, an instruction to stop supplying power to other processing blocks that are unnecessary to perform operation.

Upon completion of the above-described control in step S303, then, in step S304, the image transmitting unit 408 transmits, to the projector 100, an instruction to enable the transition to the power saving mode. When the image transmitting unit 408 receives a response indicating that the transition to the power saving mode has been enabled from the projector 100, then, in step S305, the image transmitting unit 408 starts transmitting signal data for the power saving mode. The signal data transmitted here is signal data that indicates an instruction for the projector 100 to stop writing an image signal into the frame buffer, or in other words, freeze a displayed image.

After that, the image transmitting unit 408 continuously transmits dummy signal data while periodically transmitting the above-described signal data while the PC 400 is in the power saving mode, and the processing ends.

Figure 5B:
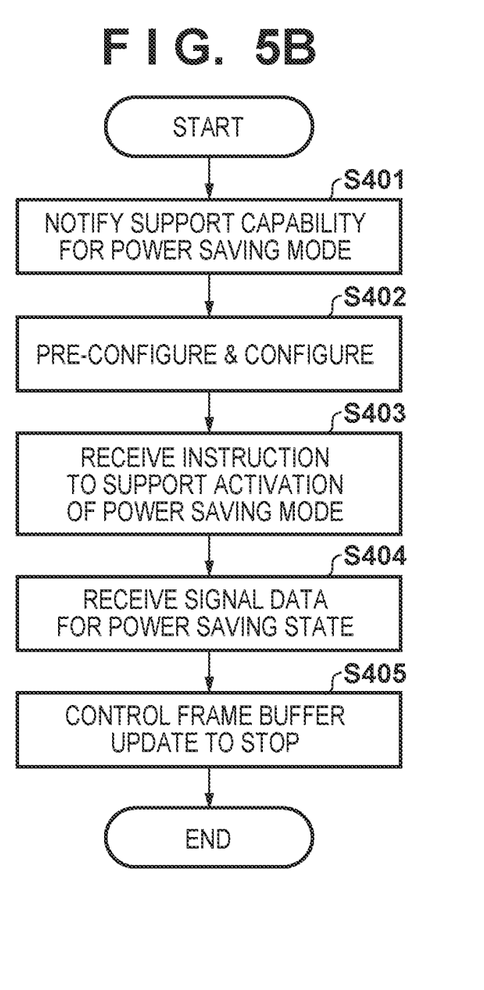

Next, an operation of the projector 100 performed in conjunction with the above-described operation of the PC 400 will be described. FIG. 5B is a flowchart illustrating the operation of the projector 100.

In step S401, upon receiving a request to transmit support capability information for transition to the power saving mode from the PC 400, the image input unit 1101 notifies the PC 400 of the support capability information based on the information stored in the performance information storage unit 1103.

In step S402, the projector 100 performs processing that needs to be performed together with the PC 400 in the above-described pre-configuration and configuration operations in step S303. In the pre-configuration operation, the image input unit 1101 changes the settings thereof based on the instruction to make settings for the communication method performed if an error occurs during the power saving mode, the instruction being transmitted from the PC 400 to the image input unit 1101. In the configuration operation, the image input unit 1101 performs handshake processing with the image transmitting unit 408 of the PC 400.

Upon completion of the above-described control in step S402, then, in step S403, the image input unit 1101 receives, from the PC 400, an instruction to enable the transition to the power saving mode.

In response to the instruction, the image input unit 1101 sends a response containing data indicating that the instruction has been received properly. Then, in step S404, the image input unit 1101 receives signal data for the power saving state transmitted from the PC 400.

The image input unit 1101 that has received the signal data notifies the control unit 101 of the fact that the signal data has been received. Then, in step S405, the control unit 101 that has been notified issues, to the RAM 132 that is a frame buffer, an instruction to stop updating the area where the data based on the image signal received from the PC 400 is deployed. Then, the image immediately before the updating is stopped is kept projected, and the processing ends.

As described above, as a result of the PC 400 and the projector 100 operating together, the PC 400 transits to the power saving state and the projector 100 continues displaying an image.

Description of Characteristic Operation of the Present Invention

Next, a characteristic operation of the present invention, specifically, an operation in which the projector 100 changes the performance information thereof that is to be transmitted to the connected PC 400 according to the capability of another projector that is cascade-connected on the topology will be described.

Figure 6:
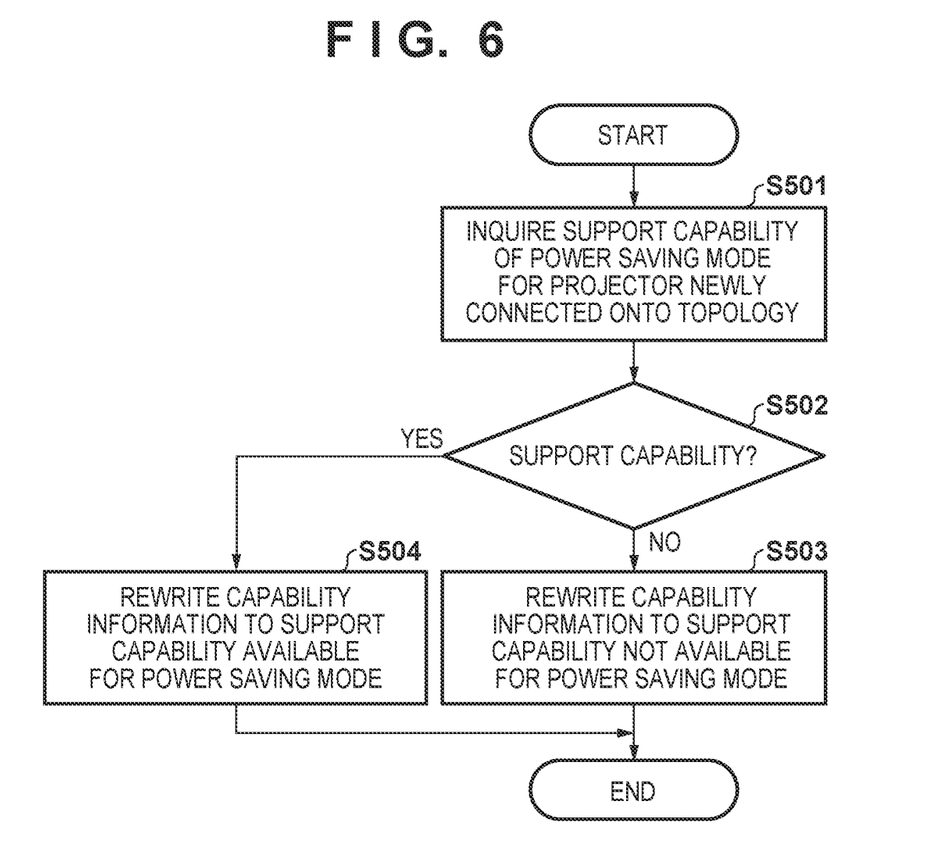
FIG. 6 is a flowchart illustrating an operation of the projector performed when another projector is added.

FIG. 6 is a flowchart illustrating the operation of changing the performance information of the projector 100 described above. This flow may be carried out at a timing when a projector is newly added to or removed from the topology, when the projector 100 is connected to the PC 400, when an instruction from the user is received, or the like. The present invention is not limited to the timings described above, but here, an example will be described in which the processing is carried out when a projector is newly connected to the topology while the PC 400 and the projector 100 are connected.

If a projector 200 is newly connected in a subsequent stage of the projector 100, information indicating that the projector 200 has been connected is transmitted to the PC 400 via the projector 100 using the AUX-CH. In response thereto, in order to assign an identification address to the projector, the PC 400 transmits data including the identification address information to the newly connected projector 200 via the projector 100.

If the control unit 101 detects that the above-described data has been transmitted through the image input/output unit 110 of the projector 100, then, in step S501, the control unit 101 issues, based on the newly assigned identification address, an instruction to output data requesting for information that indicates whether or not the projector 200 has support capability for transition to the power saving mode to the projector 200 via the image output unit 1102.

In step S502, the image output unit 1102 receives, from the projector 200, information regarding the support capability for transition to the power saving mode. Then, the control unit 101 reads the received information from the image output unit 1102, and determines whether or not the projector 200 has the support capability for transition to the power saving mode.

If the control unit 101 determines that the projector 200 does not have the support capability for transition to the power saving mode, then, in step S503, the control unit 101 writes information indicating that the projector 200 does not have the support capability for transition to the power saving mode into the storage area in the performance information storage unit 1103 of the projector 100.

If the control unit 101 determines in step S502 that the projector 200 has the support capability for transition to the power saving mode, then, in step S504, the control unit 101 writes information indicating that the projector 200 has the support capability for transition to the power saving mode into the storage area in the performance information storage unit 1103 of the projector 100.

Through this processing, the support capability information stored in the performance information storage unit 1103 of the projector 100 is constantly kept updated according to the performance of all of the image display apparatuses that are present on the topology.

As a result of the PC 400 reading the support capability information for transition to the power saving mode updated through these operation flows, whether or not the transition to the power saving mode is possible can be determined collectively based on the capability of all of the projectors that are present on the topology. Accordingly, it is possible to appropriately perform mode transition control.

Here, an example has been shown in which information regarding the support capability for transition to the power saving mode is requested when a projector is newly connected on the topology. However, in the case where a new projector is connected in a state in which a projector that does not have the support capability is already present on the topology, this operation flow may be omitted.

Also, in the present embodiment, an example has been shown in which a projector 200 is newly connected in a subsequent stage of the projector 100. However, even in the case where a projector 300 or more projectors are further connected after the projector 200 has been connected, the performance information can be updated by performing control according to the same operation flow. In this case, a method may be used in which the projector 100 acquires the performance information of the projector 300, or the projector 200 acquires the performance information of the projector 300 and transmits the performance information to the projector 100.

Furthermore, in the present embodiment, an example has been described in which projectors are used as image display apparatuses, and a PC is used as an image output apparatus. However, the present invention is not limited to this embodiment, and is also applicable to any apparatus as long as it is possible to control image signals such as a television set, a monitor, a player, or an AV amplifier.

As described above, as a result of the projector 100 updating the performance information thereof that is to be transmitted to the PC 400 based on the support capability of another projector on the topology, it is possible to appropriately control the transition of the PC 400 to the power saving mode according to the situation.

Second Embodiment

In the present embodiment, an example will be described in which the transition of the PC 400 to the power saving mode is controlled by controlling a response to an instruction to transit to the power saving mode transmitted by the PC 400 to a projector. Note that, in the present embodiment, only differences from the first embodiment will be described. The components of each apparatus are the same as those of the first embodiment, and thus a description of the components will be omitted, and differences in the operation of the projector 100 performed when controlling the transition of the PC 400 to the power saving mode will be described.

Figure 7:
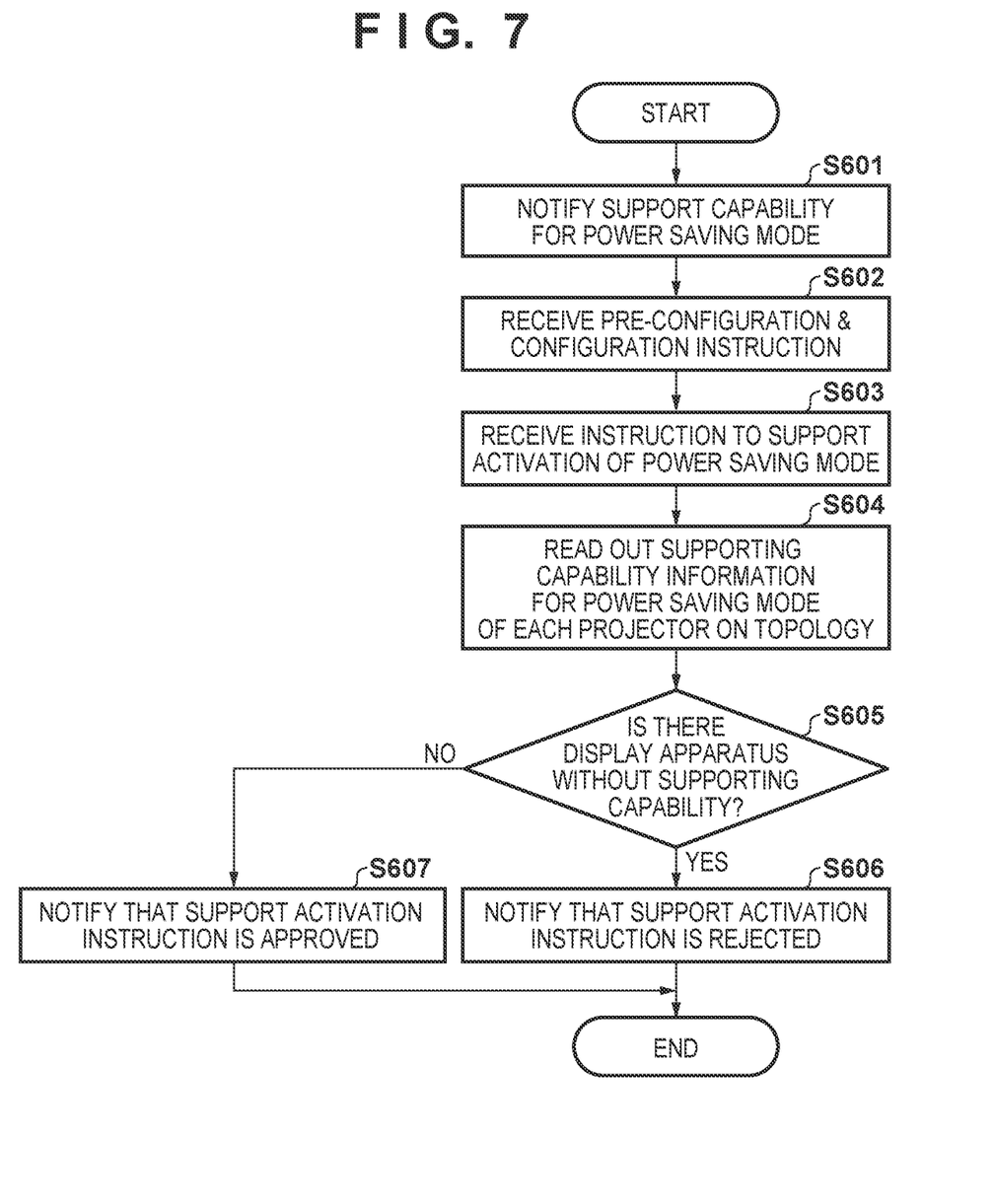
FIG. 7 is a flowchart illustrating an operation of the projector performed when transiting to the power saving mode according to a second embodiment.

FIG. 7 is a flowchart illustrating an operation of the projector 100. In the present embodiment, it is assumed that the PC 400 and the projectors 100 and 200 are cascade-connected. The flowchart shown in FIG. 7 shows an operation of the projector 100 performed after the PC 400 starts an operation for transiting to the power saving mode in the state in which the PC 400 and the projectors 100 and 200 are cascade-connected. It is assumed that the projector 100 inquires in advance of another projector on the topology (the projector 200 in the present embodiment) about whether or not the projector supports the power saving mode, and stores information regarding the inquiry in the storage unit of the projector 100. The information may be inquired and stored in the storage unit at any time before the flowchart starts.

First, the PC 400 attempts to transit to the power saving mode if the predetermined condition described in the first embodiment is satisfied. At this time, a request for support capability information for transition to the power saving mode is transmitted to the projector 100. If the image input unit 1101 included in the projector 100 receives the request, then, in step S601, the image input unit 1101 notifies the PC 400 of the result based on the information stored in the performance information storage unit 1103.

Next, in step S602, upon receiving an instruction to perform pre-configuration and configuration operations from the PC 400, the image input unit 1101 of the projector 100 performs processing according to the content of the instruction. Here, the same processing operations as the pre-configuration and configuration operations performed in step S402 shown in FIG. 5B in the first embodiment are performed.

Upon completion of the configuration operation, in step S603, the image input unit 1101 of the projector 100 receives an instruction to enable the transition to the power saving mode.

In step S604, the image input unit 1101 reads the support capability information for transition to the power saving mode of each projector on the topology, the support capability information being stored in advance in the storage unit as described above.

In step S605, the image input unit 1101 determines whether or not an image display apparatus that does not have the support capability is present on the topology. If it is determined, as a result of the determination, that an image display apparatus that does not have the support capability is present on the topology, the processing advances to step S606. If it is determined that an image display apparatus that does not have the support capability is not present on the topology, the processing advances to step S607.

In step S606, the image input unit 1101 issues a notification indicating a denial to the instruction to enable the transition to the power saving mode received in step S603.

In step S607, the image input unit 1101 issues a notification indicating an approval to the instruction to enable the transition to the power saving mode received in step S603.

As described above, the response provided in response to an instruction to the projector 100 issued when the PC 400 transits to the power saving state is switched between a response indicating a denial to the instruction and a response indicating an approval of the instruction, based on the support capability of the image display apparatuses such as projectors that are present on the topology. It is thereby possible to appropriately control the transition of the PC 400 to the power saving mode according to the situation.

In the present embodiment, an example has been described in which the response to the instruction received from the PC 400 in step S603 is switched, but the timing is not limited thereto, and the same response switching control may be performed in response to an instruction issued prior to the above-described instruction.

Third Embodiment

In the first and second embodiments, an example of a method for controlling the transition to the power saving mode performed under control of the projector 100 has been described. In the present embodiment, an example of a method for controlling the transition to the power saving mode under control of the PC 400 will be described. Note that, in the present embodiment, only differences from the first embodiment will be described. The components of each apparatus are the same as those of the first embodiment, and thus a description of the components will be omitted, and a difference, specifically, an operation performed when the PC 400 transits to the power saving mode if a predetermined condition is satisfied will be described with reference to the flowchart shown in FIG. 8.

Figure 8:
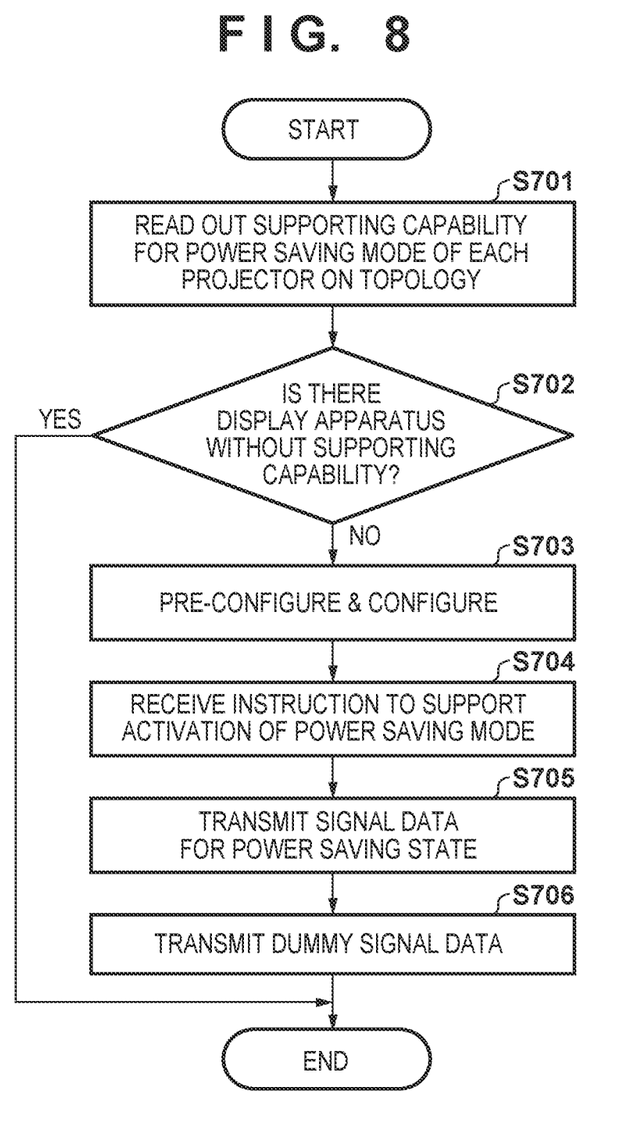
FIG. 8 is a flowchart illustrating an operation of the PC when transiting to the power saving mode according to a third embodiment.

If the predetermined condition described in the first embodiment is satisfied, the PC 400 attempts to transit to the power saving mode. At this time, in step S701, the support capability for transition to the power saving mode of each projector on the topology is read.

Specifically, identification addresses, each assigned each time a projector is connected on the topology, are stored in advance in the PC 400, and the image transmitting unit 408 transmits, based on the identification address information, data inquiring support capability information to each projector, and reads the results.

Next, in step S702, the image transmitting unit 408 determines, based on the read results, whether or not a projector that does not have the support capability for transition to the power saving mode is present on the topology. If it is determined, as a result of the determination, that a projector that does not have the support capability is present on the topology, the processing ends without the PC 400 transiting to the power saving mode.

If it is determined, in step S702, that a projector that does not have the support capability for transition to the power saving mode is not present on the topology, the processing transits to step S703, and thereafter, the processing operations for transiting to the power saving mode in steps S303 to S306 shown in FIG. 5A in the first embodiment are carried out.

As described above, when the PC 400 transits to the power saving state, it is possible to appropriately control the transition to the power saving mode by reading the support capability of the projectors that are on the topology and determining whether or not to carry out transition control based on the results.

Here, an example has been shown in which, in steps S701 and S702, the support capability of each projector is read, and determination is made based on the support capability, but the operation of this flowchart may be omitted if it has already been determined that a projector that does not have the support capability is present on the topology.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-141683, filed Jul. 31, 2019, which is hereby incorporated by reference herein in its entirety.

What is claimed is:

1. An image display apparatus comprising:
at least one processor or circuit configured to function as:
(1) an input unit that receives an image from a first external apparatus;
(2) an output unit that outputs an image to a second external apparatus;
(3) a communication unit that performs communication with the first external apparatus or the second external apparatus;
(4) a receiving unit that receives, via the communication unit, a control signal that is transmitted from the first external apparatus and that indicates that the first external apparatus transits to an image signal transmission stopping state;
(5) an inquiry unit that inquires of the second external apparatus, via the communication unit, about whether or not the second external apparatus supports the transmission stopping state; and
(6) a control unit that, in a case that the control signal is received, switches a response to the control signal according to a result of the inquiry of the inquiry unit,
wherein the control signal is a signal that indicates an instruction to enable a mode that corresponds to the transmission stopping state in the image display apparatus.

2. The image display apparatus according to claim 1, wherein the control unit updates performance information of the image display apparatus regarding whether or not the image display apparatus supports the transmission stopping state according to the result of the inquiry of the inquiry unit.

3. The image display apparatus according to claim 1, wherein the communication unit performs communication with the first external apparatus or the second external apparatus via the input unit or the output unit.

4. The image display apparatus according to claim 1, wherein the control unit switches a response to the control signal between (a) a response approving the instruction to enable the mode that corresponds to the transmission stopping state in the image display apparatus and (b) a response denying the same.

5. The image display apparatus according to claim 1, wherein the transmission stopping state is a state specified in DisplayPort protocol.

6. An image display apparatus comprising:
at least one processor or circuit configured to function as:
(1) an input unit that receives an image from a first external apparatus;
(2) an output unit that outputs an image to a second external apparatus;
(3) a communication unit that performs communication with the first external apparatus or the second external apparatus;
(4) a receiving unit that receives, via the communication unit, a control signal that is transmitted from the first external apparatus and that indicates that the first external apparatus transits to an image signal transmission stopping state;

(5) an inquiry unit that inquires of the second external apparatus, via the communication unit, about whether or not the second external apparatus supports the transmission stopping state;

(6) a control unit that, in a case the control signal is received, switches a response to the control signal according to a result of the inquiry of the inquiry unit; and (7) a projector device that stops updating a frame buffer in the transmission stopping state of the first external apparatus and keeps projecting an image immediately before the updating is stopped.

7. The image display apparatus according to claim 6, wherein the control signal is a signal that inquires about whether or not the image display apparatus supports the transmission stopping state.

8. The image display apparatus according to claim 6, wherein the control unit switches a response to the control signal between (a) a response indicating that the transmission stopping state is supported and (b) a response indicating that the transmission stopping state is not supported.

9. The image display apparatus according to claim 6, wherein the control signal is a signal that indicates an instruction to enable a mode that corresponds to the transmission stopping state in the image display apparatus.

10. The image display apparatus according to claim 6, wherein the control unit updates performance information of the image display apparatus regarding whether or not the image display apparatus supports the transmission stopping state according to the result of the inquiry of the inquiry unit.

11. The image display apparatus according to claim 6, wherein the communication unit performs communication with the first external apparatus or the second external apparatus via the input unit or the output unit.

12. The image display apparatus according to claim 6, wherein the control unit switches a response to the control signal between (a) a response approving the instruction to enable the mode that corresponds to the transmission stopping state in the image display apparatus and (b) a response denying the same.

13. The image display apparatus according to claim 6, wherein the transmission stopping state is a state specified in DisplayPort protocol.

14. An image output apparatus comprising:
at least one processor or circuit configured to function as:
(1) a transiting unit that performs a transition to an image signal transmission stopping state based on a predetermined condition;
(2) a communication unit that performs communication with one or more external apparatuses that can be cascade-connected;
(3) an inquiry unit that inquires of the one or more external apparatuses, via the communication unit, about whether or not the one or more external apparatuses support the transmission stopping state;
(4) a control unit that switches between whether or not to perform a transition to the transmission stopping state by the transiting unit according to a result of the inquiry of the inquiry unit; and
(5) a transmission unit that transmits to the one or more external apparatuses, via the communication unit, a control signal that indicates an instruction to enable a mode that corresponds to the transmission stopping state in the one or more external apparatuses.

15. The image output apparatus according to claim 14, wherein the transmission stopping state is a state specified in DisplayPort protocol.

16. A method for controlling an image display apparatus, the image display apparatus including (a) an input unit that receives an image from a first external apparatus, (b) an output unit that outputs the image to a second external apparatus, and (c) a communication unit that performs communication with the first external apparatus or the second external apparatus, the method comprising:
receiving, via the communication unit, a control signal that is transmitted from the first external apparatus and that indicates that the first external apparatus transits to an image signal transmission stopping state;
inquiring of the second external apparatus, via the communication unit, about whether or not the second external apparatus supports the transmission stopping state; and
in a case the control signal is received, switching a response to the control signal according to a result of the inquiry,
wherein the control signal is a signal that indicates an instruction to enable a mode that corresponds to the transmission stopping state in the image display apparatus.

17. A method for controlling an image output apparatus, the image output apparatus including (a) a transiting unit that performs a transition to an image signal transmission stopping state based on a predetermined condition and (b) a communication unit that performs communication with one or more external apparatuses that can be cascade-connected, the method comprising:
inquiring of the one or more external apparatuses, via the communication unit, about whether or not the one or more external apparatuses support the transmission stopping state;
switching between whether or not to perform a transition to the transmission stopping state by the transiting unit according to a result of the inquiry; and
transmitting to the one or more external apparatuses, via the communication unit, a control signal that indicates an instruction to enable a mode that corresponds to the transmission stopping state in the one or more external apparatuses.

18. A non-transitory computer-readable storage medium storing a program for causing a computer to execute the steps of a method for controlling an image display apparatus, the image display apparatus including (a) an input unit that receives an image from a first external apparatus, (b) an output unit that outputs the image to a second external apparatus, and (c) a communication unit that performs communication with the first external apparatus or the second external apparatus, the method comprising:
receiving, via the communication unit, a control signal that is transmitted from the first external apparatus and that indicates that the first external apparatus transits to an image signal transmission stopping state;
inquiring of the second external apparatus, via the communication unit, about whether or not the second external apparatus supports the transmission stopping state; and
in a case the control signal is received, switching a response to the control signal according to a result of the inquiry,
wherein the control signal is a signal that indicates an instruction to enable a mode that corresponds to the transmission stopping state in the image display apparatus.

19. A non-transitory computer-readable storage medium storing a program for causing a computer to execute the steps of a method for controlling an image output apparatus, the image output apparatus including (a) a transiting unit that performs a transition to an image signal transmission stopping state based on a predetermined condition and (b) a communication unit that performs communication with one or more external apparatuses that can be cascade-connected, the method comprising:

inquiring of the one or more external apparatuses, via the communication unit, about whether or not the one or more external apparatuses support the transmission stopping state;

switching between whether or not to perform a transition to the transmission stopping state by the transiting unit according to a result of the inquiry; and transmitting to the one or more external apparatuses, via the communication unit, a control signal that indicates an instruction to enable a mode that corresponds to the transmission stopping state in the one or more external apparatuses.

* * * * *